No. 858,651. PATENTED JULY 2, 1907.
C. E. GRIFFITH.
COMBINED HAND AND FOOT OPERATED DRIVING MECHANISM.
APPLICATION FILED JAN. 2, 1906.
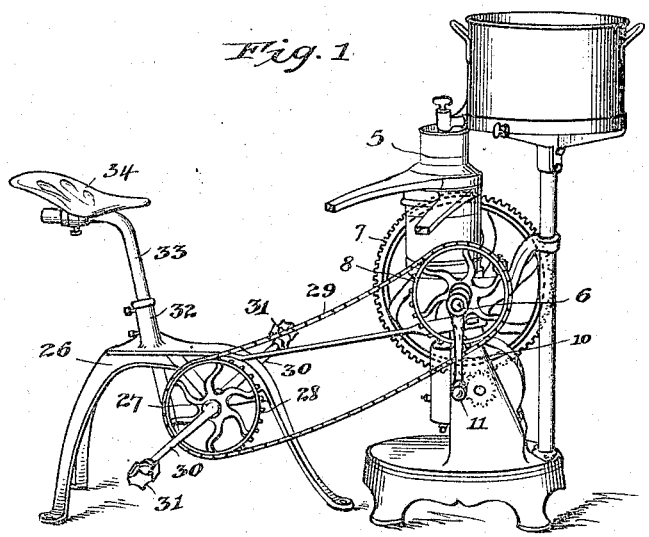
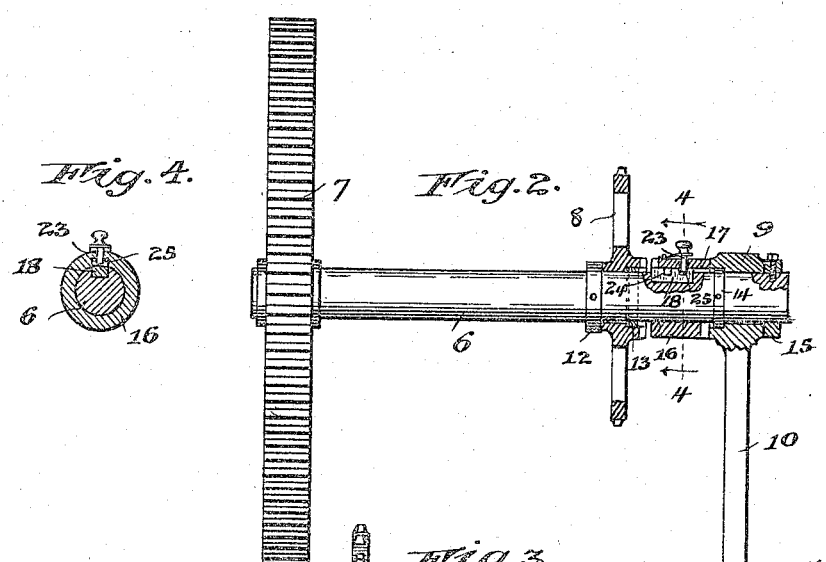
Witnesses,
S. S. Mann
S. N. Pond
Inventor
Clarence E. Griffith
By Offield, Towle & Linthicum
Attys.

UNITED STATES PATENT OFFICE.

CLARENCE E. GRIFFITH, OF CHICAGO, ILLINOIS.

COMBINED HAND AND FOOT OPERATED DRIVING MECHANISM.

No. 858,651.　　　Specification of Letters Patent.　　　Patented July 2, 1907.

Application filed January 2, 1906. Serial No. 294,192.

*To all whom it may concern:*

Be it known that I, CLARENCE E. GRIFFITH, a citizen of the United States, residing at Chicago, in the county of Cook and State of Illinois, have invented certain new and useful Improvements in Combined Hand and Foot Operated Driving Mechanisms, of which the following is a specification.

My invention relates to driving mechanisms, and has reference more particularly to a novel combination manual and pedal-operated driving mechanism for driving shafts.

The invention is more particularly designed for application to the shaft of a cream separator; and is herein illustrated in such application. But it will be understood that the mechanism is equally applicable to the driving shafts of other devices requiring comparatively light power, such as grind stones, dental engines, and the like.

My invention will be readily understood when considered in connection with the accompanying drawings illustrating the same, and wherein,—

Figure 1 is a perspective elevational view of the complete machine; Fig. 2 is an elevational view, partly broken out and in section, of the main driving shaft of the separator and its attachments; Fig. 3 is a detail plan view of the clutch which controls the hand and foot operated driving devices; and Fig. 4 is a cross-sectional view through the main shaft and clutch on the line 4—4 of Fig. 2.

Referring to the drawings, 5 designates as an entirety a cream separator of known make, with the details of which my present invention is not concerned; and 6 designates the main driving shaft thereof to which the power is applied. On one end of said shaft is a combined gear and fly wheel 7 through which power is transmitted to the internal mechanism of the separator; while the opposite projecting end of the shaft has loosely mounted thereon a sprocket wheel 8 and the hub 9 of a hand crank 10, this latter carrying the usual handle 11. The sprocket 8 is confined against lateral displacement by collars 12 and 13 on either side thereof suitably keyed to the shaft, and the hub 9 of the hand crank 10 is similarly confined by collars 14 and 15.

On the shaft 6 between the sprocket 8 and crank hub 9 is a clutch sleeve 16 that engages the shaft by means of a groove 17 in the inner wall of the sleeve engaging a spline or feather 18 set into the shaft; said sleeve having at one end clutch teeth 19 adapted to engage co-operating clutch teeth 20 formed on the hub of the sprocket, and on its other end clutch teeth 21 adapted to engage co-operating clutch teeth 22 formed on the hub 9 of the crank. The clutch sleeve may be secured in engagement with either the sprocket or the hand crank by any suitable retaining means, that herein shown comprising a spring-held pin 23 mounted in and through the clutch-sleeve adapted to engage either of a pair of holes or notches 24 and 25 formed in the spline or feather 18 as clearly shown in Figs. 2 and 4.

In a suitable stand 26 at one side of the separator is journaled a pedal shaft 27 having fast thereon a sprocket wheel 28 connected to the sprocket wheel 8 by a drive-chain 29. On the ends of the pedal shaft 27 are crank arms 30 carrying pedals 31. In a sleeve 32 of the stand 26 is adjustably secured a seat-post 33 on which is mounted a seat 34.

The operation of the device is evident from the foregoing description of its construction. When the separator is lightly loaded or is to be operated at a moderate speed, the clutch sleeve 16 is adjusted into engagement with the hub 9 of the hand crank 10, and the machine is operated by the latter, the pedal-driving mechanism being idle during such operation. On the other hand, if the separator has a full load or it is desired to operate it at a relatively high speed and with comparative ease and comfort on the part of the operator, the clutch 16 is adjusted into engagement with the hub of the sprocket 8, and the operator, seated in the seat 34, drives the apparatus by the pedal mechanism described, the hand crank at the same time lying idle.

It will thus be seen that my invention provides a simple mechanism whereby the separator may be driven either by hand or foot power, as desired or found most convenient; and also provides means whereby either driving mechanism is rendered idle while the other is operative so as to avoid constituting a drag on the machine. By the use of the pedal-operated mechanism the separation of the cream can be effected with much greater ease and comfort to the operator in many cases than where the usual hand crank alone is employed.

I claim:

1. The combination with a shaft and a crank loosely mounted thereon, of a pedal-operated driving mechanism loosely connected to said shaft, and means whereby either said crank or said pedal-operated driving mechanism may be operatively connected to said shaft, substantially as described.

2. The combination with a shaft, of a sprocket wheel loosely mounted on the latter, a hand crank also loosely mounted on said shaft, a clutch splined on said shaft between said sprocket wheel and hand crank and movable into engagement with either, and a pedal-operated driving mechanism for said sprocket wheel, substantially as described.

3. The combination with a shaft, of a sprocket wheel loosely mounted on the latter, a hand crank also loosely mounted on said shaft, a clutch splined on said shaft between said sprocket wheel and hand crank and movable into engagement with either, a stand carrying a seat located adjacent to the shaft, a pedal-operated sprocket wheel journaled in said stand, and a drive-chain connecting said sprocket wheels, substantially as described.

4. The combination with a shaft, of a sprocket wheel loosely mounted on the latter, a hand crank also loosely mounted on said shaft, a clutch sleeve splined on said shaft between said sprocket wheel and hand crank and movable into engagement with either, means for retaining said clutch sleeve in either adjusted position, a stand carrying a seat located adjacent to the shaft, a pedal-operated sprocket wheel journaled in said stand, and a drive-chain connecting said sprocket wheels, substantially as described.

CLARENCE E. GRIFFITH.

Witnesses:
FREDERICK C. GOODWIN,
SAMUEL N. POND.